United States Patent [19]

McWhorter

[11] Patent Number: 5,154,141

[45] Date of Patent: Oct. 13, 1992

[54] DUAL CYCLE ENGINE PROCESS

[76] Inventor: Edward M. McWhorter, 6931 Greenbrook Cir., Citrus Heights, Calif. 95621

[21] Appl. No.: 794,938

[22] Filed: Nov. 20, 1991

[51] Int. Cl.$^5$ ............................................. F02B 35/10
[52] U.S. Cl. ..................................... 123/21; 123/65 E; 123/65 VB; 123/568
[58] Field of Search ...................... 123/21, 65 R, 65 E, 123/65 VB, 65 VC, 65 VD, 315, 433, 568

[56] References Cited

U.S. PATENT DOCUMENTS

| | | | |
|---|---|---|---|
| 4,108,119 | 8/1978 | McWhorter | 123/315 |
| 4,248,199 | 2/1981 | McWhorter | 123/568 |
| 4,312,313 | 1/1982 | McWhorter | 123/315 |
| 4,392,459 | 7/1983 | Chareire | 123/21 |
| 5,005,539 | 4/1991 | Kawamura | 123/21 |
| 5,022,353 | 6/1991 | Kamamura | 123/21 |

Primary Examiner—David A. Okonsky

[57] ABSTRACT

The invention relates to new and useful improvements in the exhaust and induction processes of the piston driven internal combustion engine. In the invention a gas ejector is used in conjunction with a poppet valve to control the induction of air and the discharge of combustion gases through a common duct within the engine cylinder head. The common duct is brought into communication with the clearance volume above the engine piston by rotation of the engine camshaft which is made equal to the rotation of the engine crankshaft, such that the poppet valve is operated at twice the cycle frequency required for four-stroke operation in the conventional engine. By operating the valve at this cycle frequency, and by the employment of gas ejector systems at the cylinder head above the poppet valve, and at another position on the engine cylinder near the bottom dead center of the engine piston travel, the engine is able to function interchangeably as a four-stroke or as a two-stroke system while running. This is done automatically by use of an electronic timing circuit which controls the rate of fuel injection and spark ignition with the use of an engine speed sensor placed in parallel or in series circuit with a second sensor which monitors system pressure in the clearance volume above the piston.

6 Claims, 4 Drawing Sheets

DUAL CYCLE ENGINE PROCESS

CROSS REFERENCE

The invention presents a new and useful process application of my U.S. Pat. Nos. 4108119, 4248199, 4312313 and my copending application 07/798,162 and now U.S. Pat. No. 5,134,849, filed Nov. 26, 1991.

BACKGROUND OF THE INVENTION

1. Field of the Invention

The invention relates to the air induction and exhaust discharge processes of piston driven internal combustion engines which operate on either the two-stroke principle or four-stroke principle. In particular, the invention provides a new and useful process application of the gas ejector system in a manner which is unique in the operation of piston driven internal combustion engines.

2. Description of Prior Art

In its conventional application to the control of process cycles of the piston driven internal combustion engine, the gas ejector system is mounted on a engine cylinder wall port which is situated at a point near the bottom-dead-center of piston travel. The ejector port is periodically brought into communication with the displacement volume of the engine cylinder by the reciprocating motion of the engine piston as it alternately covers and uncovers the engine cylinder port.

In the present invention a second gas ejector port is situated in the engine cylinder head and is brought into communication with the clearance volume above the engine piston by the opening and closing of a cam operated poppet valve.

McWhorter describes in his U.S. Pat. Nos. 4108119, 4248199 and 4312313 the component elements of the gas ejector and teaches its useful operation in the control of gas flow within the piston driven internal combustion engine when mounted at an engine cylinder port situated above the point of bottom dead center of piston travel. The benefits of the gas ejector are well established in McWhorter's U.S. Pats. and are not mentioned in this application.

In the design of most standard engine systems two poppet valves are employed in the engine cylinder head to control the unidirectional flow through their corresponding ports and are thus able to regulate the flow of air charge to the engine cylinder and flow of combustion gas from the engine cylinder. The newer high performance engines used in todays automobiles now contain as many as four such poppet valves per engine cylinder. This has been done primarily to improve volumetric efficiency and to permit the manufacturer to decrease the engine size without loss of power to weight ratio necessary for improved fuel economy, drivability and safe highway operation. However, increasing the number of poppet valve control elements in the engine cylinder head absorbs power from the engine system by the energy required in the compression of the additional heavy valve springs and by frictional losses in valve gearing, cam bearings, sliding action of cam lobes, and the linear reciprocating of valve stems within the valve guides. Coupled with these losses are the normal inertial losses required to accelerate the increased mass of the additional poppet valve components. It should also be noted that the opportunity for component failure is increased by the greater number of moving parts to be considered in the statistical population. The additional complication of poppet valve control elements also increases the engine manufacturing costs.

In the present invention the number of poppet control valve elements is halved thereby reducing the amount of energy required for valve operation. The smaller number of moving parts required in the invention reduces the statistical incidence of failures and reduces the repair and general servicing expense. The reduction in the number of closely machined poppet valve actuation components made possible by this invention also reduces the manufacturing cost. It should also be noted that by the operation of fewer valve components made possible by the unique engine process the noise is decreased.

Another unique feature of the invention is seen in its ability to provide convective cooling to the poppet valve and poppet valve seat surfaces by the flow of the induction air following the exhaust cycle. This is made possible by the use of the gas ejector circuits described in those U.S. Patents presented in the above Cross Reference. These gas ejector circuits permit the bidirectional flow within the poppet valve port without serious exhaust gas dilution during the air induction.

The conversion of the Otto cycle or Diesel cycle, from four-stroke to two-stroke operation or vice versa cannot be accomplished in todays engines without engine tear-down and mechanical refitting. In the present invention the conversion to either method of operation is automatically achieved while the engine is running. This is accomplished by gearing the engine camshaft to operate at the same number of revolutions per minute as the engine crankshaft. Therefore, for the purpose of discussion it may be assumed that the poppet valve is always closed when the piston is at the top dead center of its travel and is always open when the piston is at the bottom dead center of its travel. Those skilled in the art will immediately recognize that by operating the poppet valve in this manner causes it to move at twice the cycle frequency as that required in the four-stroke engine. This higher cycle frequency permits the automatic conversion from low speed four-stroke operation to high speed two-stroke operation by electronic timing circuits which sense the engine speed and pressure and automatically change the rate of spark ignition and fuel injection. Other engine parameters such as temperature or engine torque may be used to control the process with equal success.

At engine start-up, and at low engine speeds and high torque conditions, the engine is operated as a four-stroke system. At high engine speeds and low torque conditions the system converts to two-stroke operation for better fuel economy.

SUMMARY OF THE INVENTION

It is the primary object of the invention to provide a unique process of engine control which permits four-stroke operation at start up and at low speed high torque conditions and for the automatic conversion to two-stroke operation at high speed low torque conditions.

Another object of the invention is to combine with a single process the low engine speed torque capability of the four-stroke process with the high speed power capability of the two stroke process such that better fuel economy is achieved and the amount of exhaust gas pollution reduced.

Another object of the invention is to control the flow to a gas injector by the use of a poppet valve, such that the flow through the poppet valve port acts as a common duct for the discharge of combustion products from the engine and on the subsequent induction cycle permits the flow of air charge into the engine. The bidirectional flow through the poppet port, without incurring serious exhaust gas dilution of the air charge is made possible by the employment of a gas ejector.

It is another object of the invention to decrease the number of moving parts required in the control of the fluid streams passing through the cylinder head thereby improving the statistical reliability of the system over that of an equivalent conventional engine.

It is yet another object of the present invention to increase the power to weight ratio of the engine by decreasing the number of engine driven components such as cams and poppet valves which absorb engine power.

And still another object of the invention is to provide convective cooling to the poppet valve and valve seat by the alternate flow of combustion gas and cooler inducted charge air past the poppet valve and poppet valve seat surfaces.

It is still another object of the invention to decrease the mechanical noise of the engine by decreasing the number of moving parts used in the control of the engine induction and exhaust circuits.

It is another object of the invention to improve the cost of maintaining the engine system by reducing the number of moving parts requiring replacement or adjustment in the scheduled periodic servicing of the engine system.

And yet still further, it is another object of the invention to replace the number of closely machined mechanical moving parts, with less expensive ejector castings and thereby decrease the manufacturing cost of the engine.

All of the foregoing and further objects and advantages of the unique process of engine control constituting this invention will become apparent from the study of the drawings and detailed descriptions herein provided.

BRIEF DESCRIPTION OF THE DRAWINGS

There are presented as part of the specification drawings of the invention showing the major elements of the engine of the character described and showing the unique process of control which is claimed.

DESCRIPTION OF THE PREFERRED EMBODIMENT

Figure 1:
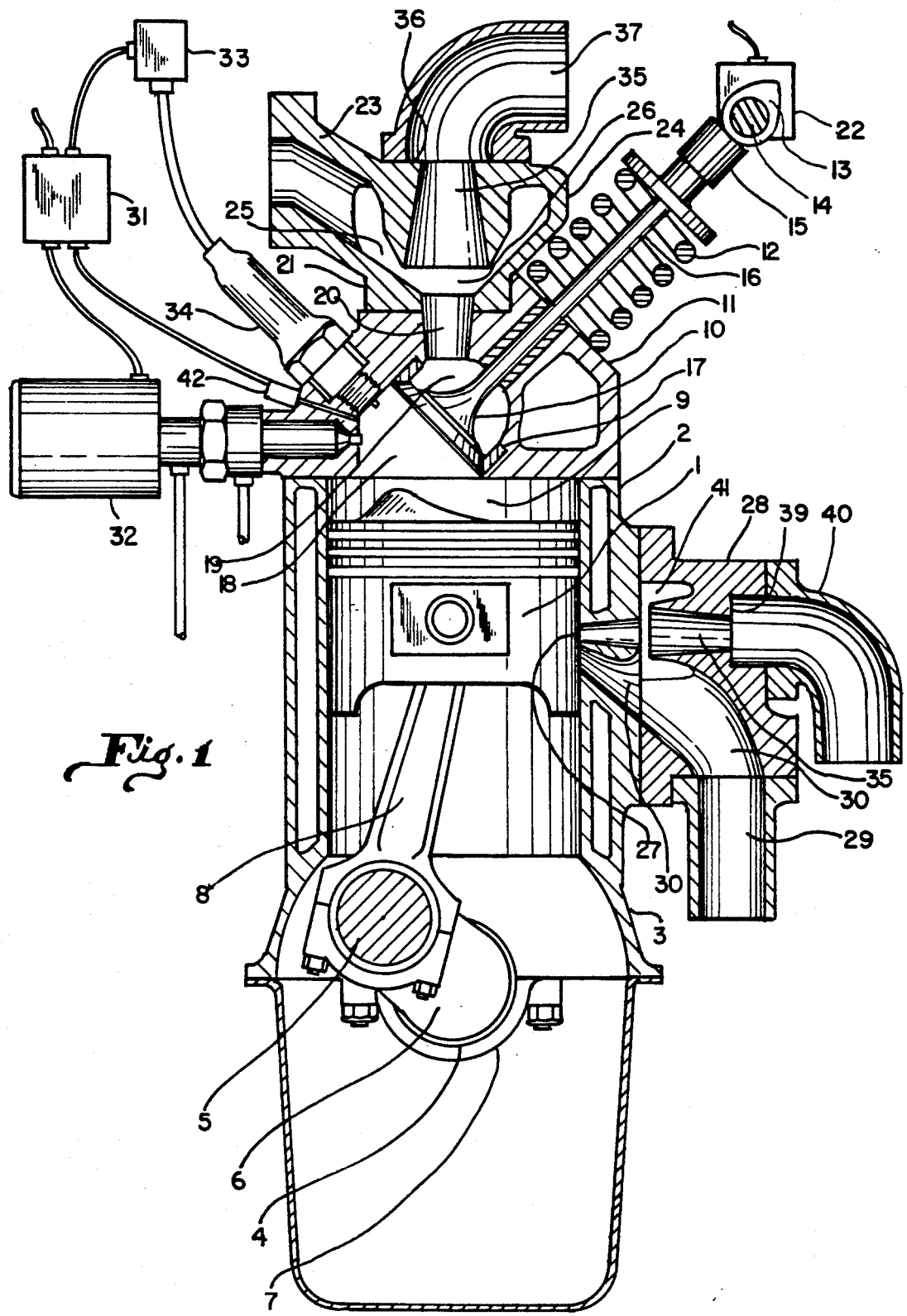
FIG. 1 is a drawing of the dual cycle engine shown principally in cross-section.

Referring now to the drawings and to FIG. 1 thereof in particular showing the principal components and gas flow circuits of the engine and gas ejector systems in cross-section. Gas flows in the various flow circuits to be discussed is produced by the pumping action of engine piston 1 reciprocating in engine cylinder 2 of engine block 3. A crankshaft 4 comprising a crankpin 5 a crankarm 6 and main journal 7, which is rotatively mounted in engine block 3. A connecting rod 8 is pivotally attached to engine piston 1 at one end and rotatively mounted on crankpin 5 at the other end. Engine piston 1, crankshaft 4 and connecting rod 8 constitute a four-bar linkage which produces reciprocation of engine piston 1 in engine cylinder 2 by the rotation of crankshaft 4 in engine block 3.

The flow of inducted air charge into cylinder volume 9 and the discharge of combustion exhaust products from the said cylinder volume 9 is controlled by poppet valve 10 slidably mounted in cylinder head 11. Poppet valve 10 is held in the normally closed position by valve spring 12 and is opened and closed by the operation of cam lobe 13 of camshaft 14 operating on the surface of valve lifter 15 attached to the stem 16 of poppet valve 10. When camshaft 14 is rotated cam lobe 13 lifts poppet valve 10 off of valve seat 17 bringing clearance volume chamber 18 into communication with valve port 19 leading to ejector nozzle 20 of cylinder head gas ejector 21 of the general type described in McWhorter U.S. Pat. No. 4248199 mounted on cylinder head 11. During the induction stroke air charge from air duct 23 filling the diffuser manifold 24 flows through air passages 25 to receiver volume 26 and enters ejector nozzle 20 flowing from there through valve port 19 and past valve seat 17 where it finally enters clearance volume chamber 18 and adjacent cylinder volume 9. Simultaneously engine piston 1 uncovers cylinder port 27 bringing cylinder volume 9 into communication with the cylinder port gas ejector 28 mounted on the engine cylinder 2 which is of the general type shown in McWhorter's U.S. Pat. No. 4312313. Air from the air duct 29 and air passages 30 of cylinder port gas ejector 28 passes through cylinder port 27 and enters cylinder volume 9 mixing with the air taken in through air passage 25 of cylinder head gas ejector 21. This completes the induction. More will be said of the induction cycle since it varies radically from that of standard four-stroke engine systems. As will be shown, the induction stroke in this engine process, with the exception of the first stroke before ignition at engine startup, requires one complete rotation of crankshaft 4, and it begins on the upward stroke slightly above bottom-dead-center of piston travel at the point where engine piston 1 covers cylinder port 27.

On the compression stroke poppet valve 10 is closed and the cylinder port 27 is covered by engine piston 1. Crankshaft 4, is rotated to a position in which engine piston 1 is approaching the top dead center of its travel, at which point electronic timer 31 sequentially energizes the fuel ejector 32 admitting fuel into the clearance volume chamber 18, and then energizes the high tension voltage source 33 sending an electrical pulse to spark plug 34, initiating ignition of the fuel/air charge mixture within clearance volume chamber 18 and combustion commences.

At a point of crankshaft 4 rotation, shortly before the engine piston 1 reaches its bottom dead center of travel, poppet valve 10 is lifted off valve seat 17 and the combustion gases within cylinder volume 9 flows through clearance volume chamber 18 into valve port 19 and through ejector nozzle 20 freely expanding at sonic velocity within receiver volume 26 entraining air from receiver volume 26 as it Passes receiver volume 26 to enter diffuser duct 35 where it is compressed and exits at step-joint 36 passing out through exhaust duct 37. The momentum exchange between the sonic exhaust stream gases and the air within the receiver volume 26 causes a pumping action which brings fresh air charge into receiver volume 26 which is available on the subsequent induction stroke. The characteristics of the gas ejector and its operation is well established and known by those skilled in the art, therefore, no claim to these characteristics or to its operation is herein made except in its application to the unique process control described. Shortly after the opening of poppet valve 10 the engine piston 1 uncovers cylinder port 27 allowing exhaust gas to exit through the cylinder port gas ejector 28, diffuser duct 38 and past step joint 39 into exhaust duct 40. This completes the exhaust cycle which is uniquely different than that of the conventionally operated four-stroke system in which the exhaust stroke is completed at the top dead center of piston travel. But what is even more unique in the process is that fresh air charge is taken into cylinder volume 9 through open poppet valve 10 and through cylinder port 27 as a result of the negative pressure created in cylinder volume 9 at blowdown.

The most unique feature of this engine control process now occurs on the upward movement of engine piston 1 after the exhaust cycle is complete and inducted air charge has been taken in at blowdown as described above. The conditions of system pressure, and engine speed now determine the mode of engine operation at this point. Three process options are available in the electronic timer 31 which selects the process most applicable for the efficient operation of the engine. These process modes are, for the purpose of discussion, herein referred to as Mode A, Mode B and Mode C.

Mode A is a four-stroke engine process in which engine speed is low, torque requirements are minimal.

Mode B is a four-stroke engine process approaching the conditions of two-stroke operation. In this mode, engine speed, as sensed by speed sensor 22, is within the range of 1000 rpm and 1800 rpm, and temperature and pressure conditions within cylinder volume 9, relative to the air pressure in receiver volume 26 of cylinder head gas ejector 21, and in receiver volume 41 of cylinder port gas ejector 28 is such that air induction is possible for a second induction at the next bottom-dead-center position of travel of engine piston 1.

Mode C is a two-stroke engine process in which engine speed is above 1800 rpm and is the normal mode used for highway driving.

Temperature and pressure conditions within cylinder volume 1 are not a consideration in the selection of Mode A and Mode C engine process cycles. However, Mode B is an intermediate step between four-stroke and two-stroke engine operation and facilitates the high speed transition to two-stroke operation, and therefore temperature and pressure are considerations when operating in this mode.

Turning now to FIGS. 2 through 5 which are diagrammatic representations of the engine shown in FIG. 1 and are presented to facilitate the discussion of each cycle of engine operation referring only to those numbered elements essential to the description of the cycle event when the engine is running in process Mode A.

Figure 2:
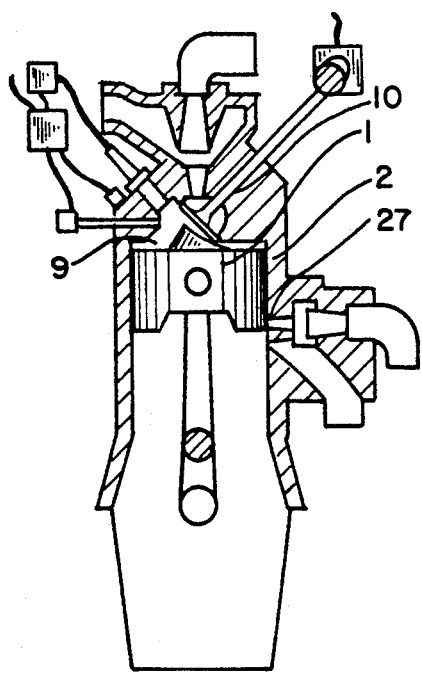
FIG. 2 is a diagrammatic drawing of the dual cycle engine showing the engine piston position at the start up induction stroke when operating in the Mode A process cycle.

FIG. 2 shows engine piston 1 at the top dead center of its travel at the beginning of the induction stroke. This particular induction stroke occurs only at the engine start up before ignition and all subsequent induction cycles will be shown to occur when the piston is at the bottom of its stroke. Poppet valve 10 is closed and remains closed until the engine piston 1 descends in the engine cylinder 2 to a point just above cylinder port 27. A negative air pressure now exists in cylinder volume 9. At this point in the induction cycle poppet valve 10 opens and cylinder port 27 is uncovered shortly thereafter and air enters cylinder volume 9 from both locations.

Figure 3:
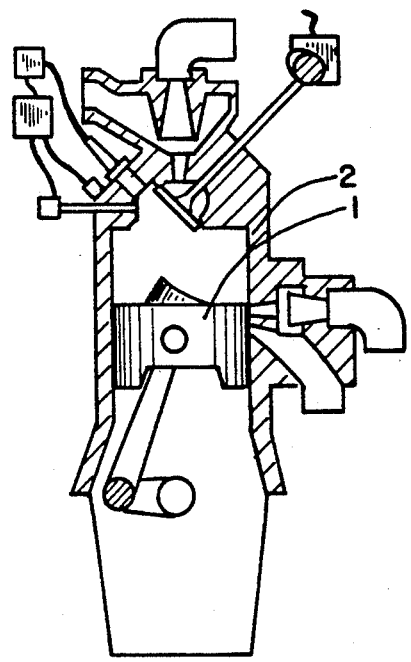
FIG. 3 is a diagrammatic drawing of the dual cycle engine showing the engine piston position at the end of the induction cycle and at the beginning of the compression cycle when operating in the Mode A process cycle.
Figure 4:
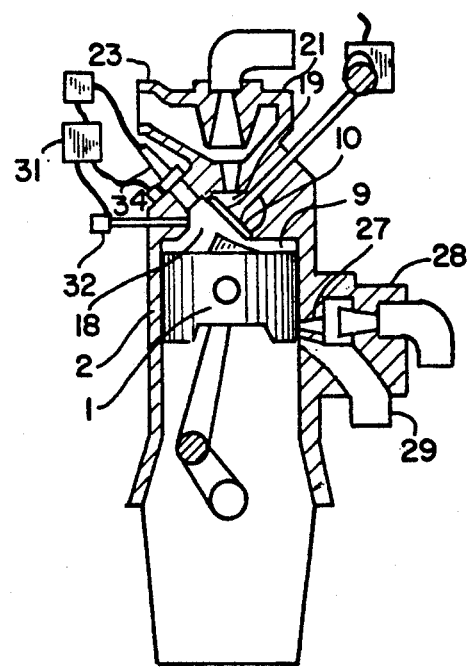
FIG. 4 is a diagrammatic drawing of the dual cycle engine showing the engine piston position at the end of the compression stroke and at the beginning of the power stroke when operating in the Mode A process cycle.

As engine piston 1 reaches its bottom dead center of travel and begins its upward travel within engine cylinder 2 poppet valve 10 closes and shortly thereafter engine piston 1 covers cylinder port 27 as shown in FIG. 3, the induction stroke is complete and the compression stroke begins. When engine piston 1 reaches a point near the top dead center of its travel within engine cylinder 2 as shown in FIG. 4 the compression stroke is nearly complete. Electronic timer 31 energizes fuel injector 32 injecting fuel into clearance volume chamber 18, and shortly thereafter spark plug 34 is energized initiating ignition and combustion within clearance volume chamber 18 and cylinder volume 9 and the power stroke begins. The combustion gas pressure in cylinder volume 9 drives the engine piston 1 downward within engine cylinder 2. When engine piston 1 is just above cylinder port 27 poppet valve 10 opens and shortly thereafter engine piston 1 uncovers cylinder port 27 and the power stroke ends and blowdown begins. A negative pressure is produced in cylinder volume 1 during blowdown thus a reversal of flow direction occurs in cylinder port 27 and in valve port 19 bringing fresh charge air into cylinder volume 9 from ejector air duct 29 of the cylinder port gas ejector 28 and from ejector air duct 23 of cylinder head gas ejector 21 respectively. During this period the engine piston 1 is near the bottom dead center as shown in FIG. 5.

Figure 5:
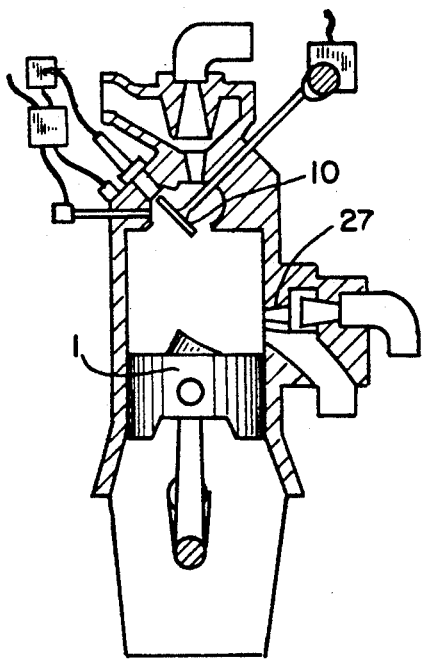
FIG. 5 is a diagrammatic drawing of the dual cycle engine showing the engine piston position near the bottom dead center of its travel at blow-down when operating in the Mode A process cycle.

From its position shown in FIG. 5 engine piston 1 now moves upward as poppet valve 10 closes. At the point where engine piston 1 closes cylinder port 27 the exhaust blowdown is complete and the next induction cycle begins. This engine piston 1 position is shown in FIG. 6.

Since the start up induction is different than the steady-state operating induction cycle one more induction cycle must be described in order to complete the process description.

Figure 6:
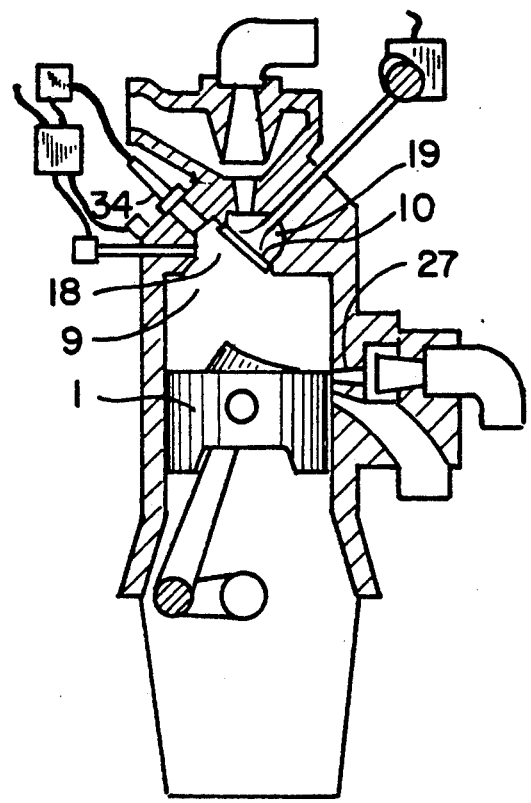
FIG. 6 is a diagrammatic drawing of the dual cycle engine showing the engine piston positions at the beginning of the induction stroke and at the end of the induction when operating in the Mode A process cycle.

With the engine piston 1 in the position shown in FIG. 6 the steady-state induction begins. It will be noted that the induction process in this instance starts at a point near the bottom dead center of engine piston 1 travel where on start up induction it started in the conventional top dead center of its travel. The engine piston 1 moves upward in engine cylinder 2 to the top dead center of travel compressing the air charge previously taken in. This compression causes the air to be heated. At this point it is important to note that no fuel is injected into the clearance volume chamber 18 and that spark plug 34 is not energized. The engine piston 1 now moves downward in engine cylinder 2 from the top dead center of its travel. When the engine piston 1 reaches a point just before it uncovers cylinder port 27 poppet valve 10 opens. If the pressure of the heated air within cylinder volume 9 is greater than the ambient operating pressure outside engine cylinder 2 some heated air will be lost through valve port 19. However, if the pressure within cylinder volume 9 is less than the ambient air outside the engine cylinder 2 air is drawn into cylinder volume 9. Because of the slower engine speeds of Mode A process operation which allows a longer fill time during the negative pressure phase of blowdown the incidence for potential air lose through valve port 19 is more frequent. However, during further downward travel of the engine piston 1, volume is increased and the pressure in cylinder volume 9 decreases below the ambient operating pressure outside of engine cylinder 2. As engine piston 1 uncovers cylinder port 27 cool air enters the cylinder volume 9 mixing with the heated air causing it to contract drawing additional air into cylinder volume 9 through open valve port 19 and through cylinder port 27. After engine piston 1 passes its bottom-dead-center of travel and moves upward to again assume the position shown in FIG. 6 the induction cycle is complete and the compression stroke begins.

The unique features of the induction cycle process described above is that it starts near bottom dead center of engine piston 1 and requires one full revolution to complete. Secondly, the air charge is taken into the cylinder at two separate points in the cycle. Air charge is inducted into cylinder volume 9 during the negative pressure phase of the blowdown and one revolution later during the time when engine piston 1 again is near the bottom dead center of its travel when poppet valve 10 and cylinder port 27 are both open. Another feature of the induction is that the air charge is brought into cylinder volume 1 at two locations, valve port 19 and cylinder port 27. The capability to induct air twice during the induction cycle and having two openings into cylinder volume 1 improve the systems volumetric efficiency.

Those skilled in the art will recognize the fact that ignition could be initiated on each top dead center position of engine piston 16 such that a two-stroke operation could be utilized However, better fuel economy is achieved when the engine is operated in the four-stroke mode at low engine speeds where the torque requirement at such speed does not justify the doubling of the fuel injection rate to achieve two-stroke operation. Therefore, at engine idle, and at slow stop and go conditions, as is generally encountered in city driving in congested traffic, the four-stroke, Mode A process is preferred. Operating in the Mode A process also halves the number of exhaust cycles necessary to perform the same low speed duty cycle and therefore is less polluting. Furthermore, where greater slow engine speed torque is required at slow vehicle speeds, such as climbing ramps etc, it is more economically achieved in the power train gearing.

It should also be noted that the sequencing of the fuel injection and high tension electrical spark may occur completely coincidental, or overlapping, or as completely separated engine events. In the invention these are discused as separately occurring events in order to facilitate the discussion.

Turning now to FIGS. 7 through 10 which are used to illustrate the operation of the engine in the Mode B process cycle. Mode B operation is a four-stroke process which is preferred in the operating range of engine speeds between 1000 rpm to 1800 rpm. Mode B process is an optional process and is not essential to the changing from four-stroke to two-stroke operation, although in this respect it does facilitate the adjustment of the fuel injector 32 operation, such that the changing from Mode A to Mode C is more easily handled. Mode B process may be thought of as being the same as Mode C process operation where fuel injection occurs at each top-dead-center of engine piston 1 travel but where the ignition occurs only on every second top-dead-center position. Mode B process operation provides a method to achieve better fuel/air charge mixing necessary to clean and efficient combustion when operating as a four-stroke system at faster engine speeds.

In the engine speed range of the Mode B process, the two step air charging, as described in the Mode A process, is less efficient because of the shorter fill time during the blowdown resulting from the faster opening and closing of poppet valve 10 and cylinder port 27. This loss is slightly offset by the more efficient operation of the gas ejector systems as a result of the larger volume of exhaust gases processed which by their increased momentum exchange pump a greater quantity of air into their respective receivers.

Figure 7:
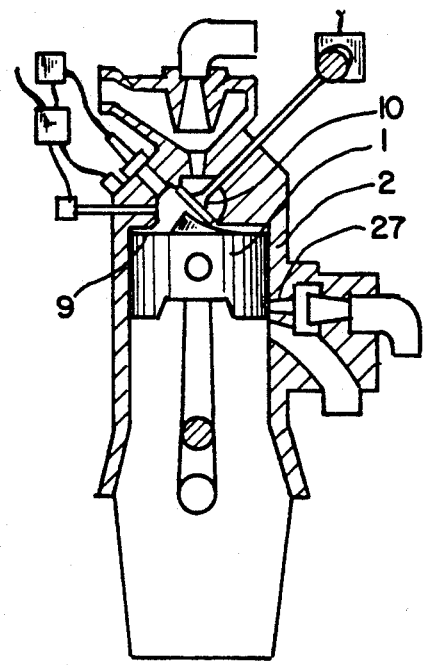
FIG. 7 is a diagrammatic drawing of the dual cycle engine showing the engine piston position at the start up induction stroke when operating in the Mode B process cycle.

Turning now to FIG. 7 diagram which shows engine piston 1 at the top of its travel at the beginning of the induction stroke with poppet valve 10 closed. As the engine piston 1 descends in engine cylinder 2 to a position just above cylinder port 27 poppet valve 10 opens allowing air to enter cylinder volume 9 and shortly thereafter engine piston 1 uncovers cylinder port 27 and air enters the cylinder volume 9 from cylinder port 27. Engine piston 1 reaches the bottom dead center position of its travel and shortly thereafter poppet valve 10 closes and as engine piston 1 proceeds higher up engine cylinder 2 and covers engine port 27 as shown in FIG. 8.

Figure 8:
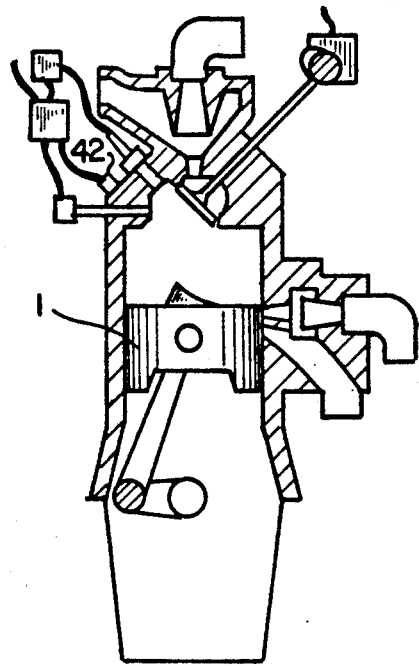
FIG. 8 is a diagrammatic drawing of the dual cycle engine showing the engine piston at the end of the induction cycle and at the beginning of the compression cycle when operating in the Mode B process cycle.

It should be noted that this portion of the engine process cycle is the same as that given for Mode A process operation where the piston positions shown in FIGS. 2 and 3 are identical to those shown in FIGS. 7 and 8. However, the system pressure of cylinder volume 9 is lower in Figure 8 than in the corresponding FIG. 3 because of the shorter fill time of the blowdown event at the faster Mode B operation as discussed above.

At engine speeds greater than approximately 1200 rpm, when the engine piston 1 is at the position shown in FIG. 8, the system pressure, referred to as P1, of cylinder volume 1 is sensed by pressure transducer 42. The engine piston 1 then travels to the position shown in FIG. 9, which is a point of engine piston 1 travel just before top-dead-center. At this point the system pressure of cylinder volume 9, now referred to as P2, is again sensed by pressure transducer 42. If the ratio of the electric signal of P1 to that of P2 is below a certain value electronic timer 31 energizes fuel injector 32 and fuel charge is placed in clearance volume chamber 18. If the ratio of the electric signal of P1 to P2 is above a certain value no fuel injection occurs and the process may be considered to be operating in the Mode A process. Those skilled in the art will recognize that the ratio of the electric signals of P1 to P2 will depend on the engine design compression ratio, change of engine speed with an attendant change in the rate of compression with a corresponding change in temperature which in accordance with the general thermodynamic relationship of system pressure P, volume V, and temperature T, follow the laws of Charles and Boyle in which the change in system conditions in going from engine piston 1 position shown in FIG. 7 to that of FIG. 8 is given by the approximate relationship $P1/P2 = V2/V1 = T2/T1$. The ratio of the electric signals of P1 to P2 should be of such a range as to permit the operation of the process cycle over a range of fuel energy content which raises or lowers the engine equilibrium operating temperature and thus effect changes in the P1 to P2 ratio.

After the fuel injection is completed no ignition occurs. The injected fuel vaporizes in the heated air charge environment of clearance volume chamber 9 but does not result in a significant pressure rise in cylinder volume since the engine piston 1 is beginning to descend in engine cylinder 2. Evaporation of the fuel absorbs energy and the overall system temperature of volume 1 is slightly lower causing a slight contraction of the gas/air charge although this has no great effect upon the system pressure.

As the engine piston 1 nears cylinder port 27 poppet valve 10 opens, but no fuel/air charge is lost since the ratio of P1 to P2 electric signals assure that at this point in the system pressure in cylinder volume 9 is less than the operating ambient pressure outside of engine cylinder 2. In fact some air may be taken in through open valve port 19. As engine piston 1 descends to its bottom dead center position of travel cylinder port 27 is uncovered and some air may be inducted through it. At bottom dead center position of engine piston 1 travel poppet valve 10 is closed, and engine piston 1 rises to the point where it covers cylinder port 27. This completes the air induction cycle, this position is the same as that shown in previous FIG. 8.

At the engine piston 1 position shown in FIG. 8 the compression cycle begins with the piston moving upward in engine cylinder 2 until it reaches the position just before top-dead-center of its travel. If the engine speed is greater than approximately 1200 rpm electronic timer 31 energizes fuel injector 32 and more fuel is placed in the clearance volume chamber 18. If the engine is below approximately 1200 rpm no fuel injection occurs. The electronic timer 31 then energizes spark plug 34 igniting the fuel/air charge previously injected and the power stroke begins. When the engine piston 1 reaches a point just above the cylinder port 27 poppet valve 10 opens and exhaust products stream through open valve port 19 and through ejector nozzle 20 and freely expand at sonic velocity through receiver volume 26 entraining air from receiver volume 26 by momentum exchange with the high velocity exhaust gases from ejector nozzle 20 and are captured in diffuser duct 35, compressed and discharged past step-joint 36 and exit the engine through exhaust duct 37. The operation of the cylinder head gas ejector 21 brings a fresh air charge into receiver volume 26 in preparation for the next air charge.

As the engine piston 1 descends further down into engine cylinder 2 cylinder port 27 is uncovered and exhaust gas streaming through this port operates the cylinder port gas ejector 28 in the same manner as that of cylinder head gas ejector 21 described above. The engine piston 1 then descends to its bottom-dead-center and poppet valve 10 closes. The engine piston 1 then ascends to the position where it closes the cylinder port 27 and is at the position for the next induction cycle. This position is shown in FIG. 10.

Figure 10:
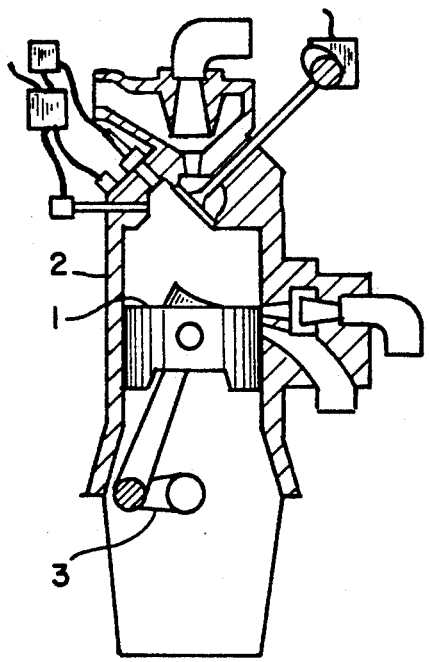
FIG. 10 is a diagrammatic drawing of the dual cycle engine showing the engine piston position at the end of the induction cycle when operating in the Mode B process cycle.
Figure 9:
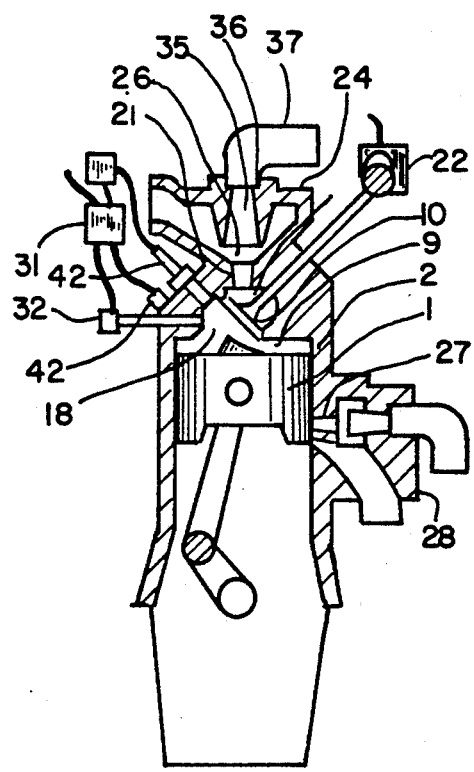
FIG. 9 is a diagrammatic drawing of the dual cycle engine showing the piston position near the top of the first compression cycle of the induction air charge when operating in the Mode B process cycle.

It will be noted, that except for the first induction stroke, the induction stroke begins with the engine piston 1 positioned at a point near the bottom dead center of its travel upward in engine cylinder 2 as shown in FIG. 10. Those skilled in the art will immediately recognize that this is different than the normal four-stroke operation of the Otto and Diesel cycle processes where the induction stroke begins at the top dead center of piston travel.

Another unique feature of the present invention is that when the engine is operating in the four-stroke mode of Modes A and B the induction process requires two strokes where the conventional engine systems require only a single downward stroke.

Because the induction cycle of the engine process of the present invention requires one complete revolution of crankshaft 4, four different processes may be employed in going from slow engine speeds of 1000 rpm or less, through the medium speed range, between 1000 rpm and 1800 rpm, to the engine fast speed high power range above 1800 rpm. These four fuel injection processes are:

Slow speed Mode A engine operation below 1000 rpm, fuel injection and ignition occur near the top dead center of piston travel during the compression stroke.

Low to medium speed Mode B engine operation between 1000 rpm and 1200 rpm fuel injection occurs near the top dead center position of the induction stroke and ignition occurs near the top dead center position of the compression stroke.

Medium to fast speed Mode B engine operation between 1200 rpm and 1800 rpm fuel injection occurs near the top dead center of piston travel during the induction stroke and again at the top dead center of piston travel during the compression stroke at which point ignition occurs.

Fast speed Mode C engine operation over 1800 rpm fuel injection and ignition occur at each top dead center position of engine travel.

Maximum brake thermal efficiency occurs at that engine speed where the brake horsepower curve passes through the engine torque curve. The fuel consumption of the engine is lowest at this point. This invention provides the capability of using the high torque performance of the four stroke engine at lower engine speed for heavy starting loads and to instantly convert to two-stroke operation where high speed acceleration is more efficient. This feature of the design improves the thermal efficiency of the engine by increasing the high engine speed torque and horsepower and thus provides better overall fuel economy.

It is recognized that in its operation electronic timer 31 must control the fuel/air charge at a specific design ratio as well as the sequence of electrical events of fuel injection and ignition within the fixed events of the mechanical design and that in this respect there is a latitude of practical application.

Those skilled in the art will recognize that the engine process can be made to run on the Diesel cycle by the removal of spark plug 34 which permits clearance volume chamber 18 to be reduced in size to achieve a higher compression ratio required to promote ignition. When operating as a Diesel engine only Mode A and Mode C operations are possible.

The objectives of the engine process as previously stated, are not limited to a single mode of operation but contain a series of engineering options which can be brought to bear directly upon the design to obtain better fuel economy, and lower environmental pollution. In one design the engine process utilizes only the cylinder head gas ejector 21 of FIG. 1 and cylinder port 27 and cylinder port gas ejector 28 of FIG. 1 are removed.

What is claimed is:

1. A process for suppling charge air to an engine and for discharging combustion gases from said engine in a manner which permits said engine to change from four-stroke operation to two-stroke operation while said engine is operating, said engine comprising an engine block, an engine cylinder, an engine piston slidably mounted in said cylinder, a connecting rod pivotally attached to said engine piston at one end and rotatively mounted on a crankpin of a crankshaft at the other end, said crankshaft comprising a main journal, a crank arm and said crankpin, said crankshaft rotatively mounted in said engine block, said engine piston, said connecting rod, and said crankshaft, comprising a four bar linkage for reciprocating said engine piston in said engine cylinder, said engine cylinder having a cylinder port which is periodically covered and uncovered by said engine piston reciprocating in said engine cylinder, a cylinder port gas ejector fixedly mounted on said engine cylinder over said engine cylinder port, said cylinder port gas ejector comprising an air flow circuit and an exhaust flow circuit, said air flow circuit comprising an air duct, a diffuser manifold, an air passage, a receiver volume, said exhaust flow circuit comprising an ejector nozzle, a diffuser duct, a step joint, an exhaust duct, said air flow circuit being brought into communication with the cylinder volume of said engine cylinder above said engine piston by the periodic uncovering of said cylinder port by said engine piston, said air flow circuit of said cylinder port gas ejector conducting air flow periodically through said cylinder port into said engine cylinder when said engine piston uncovers said cylinder port when the pressure within said receiver volume of said cylinder port gas ejector is greater than the pressure within said engine cylinder, said exhaust circuit of said cylinder port gas ejector conducting combustion gas from said engine cylinder through said cylinder port when said engine piston uncovers said cylinder port when the pressure within the said engine cylinder is greater than the pressure in the said receiver volume of said cylinder port gas ejector, said engine cylinder being closed at the upper end above said engine piston by a cylinder head fixedly mounted on said engine cylinder, said cylinder head comprising a clearance volume chamber, a valve port adjacent to said clearance volume chamber, a poppet valve slidably mounted in said cylinder head for opening and closing said valve port, said poppet valve having a stem, a valve lifter mounted on said stem, a valve spring over said valve stem for holding said poppet valve in a closed position, a camshaft rotatively mounted on said cylinder head over said poppet valve, a speed sensor mounted on said camshaft to measure rotational speed of said camshaft, said camshaft comprising a cam lobe and a shaft, said cam lobe of said camshaft slidably working on said valve lifter to periodically open and close said poppet valve bringing said clearance volume chamber into periodic communication with said valve port, said camshaft and said crankshaft being made to rotate at the same frequency of revolution such that said poppet valve is closed when said engine piston is at its top dead center of travel and said poppet valve is open when said engine piston is at the bottom dead center of its travel, a cylinder head gas ejector fixedly mounted on said cylinder head over said valve port, said cylinder head gas ejector comprising an air flow circuit and an exhaust flow circuit, said air flow circuit comprising an air duct, a diffuser manifold, an air passage, a receiver volume, said exhaust flow circuit comprising an ejector nozzle, a diffuser duct, a step joint, an exhaust duct, said air flow circuit of said cylinder head gas ejector conducting air flow periodically through said valve port into said clearance volume chamber when said poppet valve is open when the pressure within said valve port is greater than the pressure within said clearance volume chamber, said exhaust flow circuit of said cylinder head ejector conducting combustion gas from said engine cylinder through said valve port when said poppet valve is open when the pressure in said cylinder is greater than the pressure in said valve port, fixedly mounted on said cylinder head in communication with said clearance volume chamber, a fuel injector, a spark plug, a pressure transducer, adjacent to said engine block an electronic timer, said electronic timer receiving electrical input signals from said engine speed sensor and from said pressure transducer, said electronic timer controlling generated electrical impulses energizing said fuel injector causing fuel to be admitted into said clearance volume, said electronic timer controlling electrical impulses of a high tension voltage source which are sent to said spark plug to ignite said injected fuel.

2. The engine process of claim 1 in which fuel is injected into said clearance volume chamber when the said engine piston rises to its near top dead center position in said engine cylinder and on the following cycle when the said engine piston rises again to its near top dead center position in said engine cylinder it is ignited.

3. The engine process of claim 1 in which fuel is injected into said clearance volume chamber each time the said engine piston rises to its near top dead center position in engine cylinder and ignited on every other rise of said engine cylinder piston to its near top dead center position in said engine cylinder.

4. The engine process of claim 1 in which fuel is injected into the clearance volume chamber and ignited each time the said engine piston rises to its near top dead center position in said engine cylinder.

5. A process for supplying charge air to an engine and for discharging combustion gases from said engine in a manner which permits said engine to change from four-stroke operation to two-stroke operation while said engine is operating, said engine comprising an engine block, an engine cylinder, an engine piston slidably mounted in said cylinder, a connecting rod pivotally attached to said engine piston at one end and rotatively mounted on a crankpin of a crankshaft at the other end, said crankshaft comprising a main journal, a crank arm and said crankpin, said crankshaft rotatively mounted in said engine block, said engine piston, said connecting rod, and said crankshaft, comprising a four bar linkage for reciprocating said engine piston in said engine cylinder, said engine cylinder having a cylinder port which is periodically covered and uncovered by said engine piston reciprocating is said engine cylinder, a cylinder port gas ejector fixedly mounted on said engine cylinder over said engine cylinder port, said cylinder port gas ejector comprising an air flow circuit and an exhaust flow circuit, said air flow circuit comprising an air duct, a diffuser manifold, an air passage, a receiver volume, said exhaust flow circuit comprising an ejector nozzle, a diffuser duct, a step joint, an exhaust duct, said air flow circuit being brought into communication with the cylinder volume of said engine cylinder above said engine piston by the periodic uncovering of said cylinder port by said engine piston, said air flow circuit of said cylinder port gas ejector conducting air flow periodically through said cylinder port into said engine cylinder when said engine piston uncovers said cylinder port when the pressure within said receiver volume of said cylinder port gas ejector is grater than the pressure within said engine cylinder, said exhaust circuit of said cylinder port gas ejector conducting combustion gas from said engine cylinder through said cylinder port when said engine piston uncovers said cylinder port when the pressure within the said engine cylinder is greater than the pressure in the said receiver volume of said cylinder port gas ejector, said engine cylinder being closed at the upper end above said engine piston by a cylinder head fixedly mounted on said engine cylinder, said cylinder head comprising a clearance volume chamber, a valve port adjacent to said clearance volume chamber, a poppet valve slidably mounted in said cylinder head for opening and closing said valve port, said poppet valve having a stem, a valve lifter mounted on said stem, a valve spring over said valve stem for holding said poppet valve in a closed position, a camshaft rotatively mounted on said cylinder head over said poppet valve, a speed sensor mounted on said camshaft to measure rotational speed of said camshaft, said camshaft comprising a cam lobe and a shaft, said cam lobe of said camshaft slidably working on said valve lifter to periodically open and close said poppet valve bringing said clearance volume chamber into periodic communication with said valve port, said camshaft and said crankshaft being made to rotate at the same frequency of revolution such that said poppet valve is closed when said engine piston is at its top dead center of travel and said poppet valve is open when said engine piston is at the bottom dead center of its travel, a cylinder head gas ejector fixedly mounted on said cylinder head over said valve port, said cylinder head gas ejector comprising an air flow circuit and an exhaust flow circuit, said air flow circuit comprising an air duct, a diffuser manifold, an air passage, a receiver volume, said exhaust flow circuit comprising an ejector nozzle, a diffuser duct, a step joint, an exhaust duct, said air flow circuit of said cylinder head gas ejector conducting air flow periodically through said valve port into said clearance volume chamber when said poppet valve is open when the pressure within said valve port is greater that the pressure within said clearance volume chamber, said exhaust flow circuit of said cylinder head ejector conducting combustion gas form said engine cylinder through said valve port when said poppet valve is open when the pressure in said cylinder is greater than the pressure in said valve port, fixedly mounted on said cylinder head in communication with said clearance volume chamber, a fuel injector, a pressure transducer, adjacent to said engine block an electric timer, said electronic timer receiving electrical input signals from said engine speed sensor and from said pressure transducer, said electronic timer controlling generated electrical impulses energizing said fuel injector causing fuel to be admitted into said clearance volume, said fuel to be ignited by the heat of compression within the said clearance volume when the piston is near the top center of its travel.

6. The engine process of claim 5 in which said fuel is injected into the said clearance volume at alternate strokes of said piston when said piston is near the top center of its travel.

* * * * *